United States Patent
Lee

(10) Patent No.: US 6,937,942 B2
(45) Date of Patent: Aug. 30, 2005

(54) METHOD AND APPARATUS OF DETECTING TOOL ABNORMALITY IN A MACHINE TOOL

(75) Inventor: Sang Ho Lee, Kyongnam (KR)

(73) Assignee: Daewoo Heavy Industries & Machinery Ltd., Incheon (KR)

( * ) Notice: Subject to any disclaimer, the term of this patent is extended or adjusted under 35 U.S.C. 154(b) by 0 days.

(21) Appl. No.: 10/747,274

(22) Filed: Dec. 30, 2003

(65) Prior Publication Data

US 2004/0153259 A1 Aug. 5, 2004

(30) Foreign Application Priority Data

Dec. 30, 2002 (KR) ................................ 10-2002-0086716

(51) Int. Cl.[7] .......................... G01B 3/44; G05B 23/02; G05B 19/18
(52) U.S. Cl. .................... 702/34; 318/568.11; 318/569; 702/33
(58) Field of Search ............................ 702/33–35, 179; 73/866.5; 318/566, 569, 609, 57; 348/86; 700/175, 190

(56) References Cited

U.S. PATENT DOCUMENTS

| | | | | |
|---|---|---|---|---|
| 4,723,219 A | * | 2/1988 | Beyer et al. ................ | 700/190 |
| 5,243,533 A | * | 9/1993 | Takagi et al. ............... | 700/175 |
| 5,773,940 A | * | 6/1998 | Matsukawa ................... | 318/59 |
| 5,773,949 A | * | 6/1998 | Nagatomi et al. ...... | 318/568.11 |
| 5,819,202 A | * | 10/1998 | Sato et al. ..................... | 702/33 |
| 6,201,567 B1 | * | 3/2001 | Kuroda ......................... | 348/86 |
| 6,344,724 B1 | * | 2/2002 | Kakino et al. ............. | 318/569 |
| 6,384,560 B1 | * | 5/2002 | Kakino et al. ............. | 318/566 |

* cited by examiner

*Primary Examiner*—John Barlow
*Assistant Examiner*—John Le
(74) *Attorney, Agent, or Firm*—Lowe Hauptman & Berner, LLP

(57) ABSTRACT

A method and apparatus is provided of detecting tool abnormality in a machine tool. Permissible minimum and maximum values of load current in a real cutting section are determined for a spindle motor and a servomotor during normal operation of the machine tool. The load current of the spindle motor and the servomotor is measured while the machine tool is operated. The load current measured in a real cutting section other than a non-cutting section is extracted by way of filtering the load current measured. A judgment is made as to whether the extracted load current is within a range between the minimum and maximum values. Occurrence of the tool abnormality is confirmed if the extracted load current falls outside the range. This enables the machine tool to detect not only overload condition due to excessive wear of a tool but also non-load condition induced by a tool breakage.

5 Claims, 5 Drawing Sheets

METHOD AND APPARATUS OF DETECTING TOOL ABNORMALITY IN A MACHINE TOOL

BACKGROUND OF THE INVENTION

1. Field of the Invention

The present invention is directed to a method and apparatus of detecting tool abnormality in a machine tool and more specifically to a method and apparatus whereby tool wear and damage can be detected on the basis of electric current measured in the real cutting section of a machine tool.

2. Description of the Prior Art

As is generally known in the art, conventional machine tools for use in cutting or machining a workpiece are provided with one or more servomotor that serves to feed the workpiece and a spindle that holds a tool adapted to cut the workpiece into a desired configuration.

The machine tool carries out the cutting operation while the workpiece is fed along a predetermined path by means of the servomotor. If there occurs such abnormality as impermissible degree of wear, the cutting operation will not proceed smoothly and therefore the machine tool will suffer from overload.

In the past, the overload condition was determined by use of an external sensor or a computerized numerical controller that can detect load-dependent current value of the spindle motor and the servomotor. In other words, the overload condition was detected by determining whether the current value supplied to the spindle motor or the servomotor exceeds a preselected maximum reference value, under the assumption that the overload condition shall necessarily take place at the occurrence of tool abnormality.

At this time, in order that the overload detection should be accomplished only at the real cutting section, the load applied to the spindle motor is detected for the section other than accelerating and decelerating sections where the workpiece is simply fed, and the load applied to the servomotor is detected for the section other than a prompt feeding section and accelerating and decelerating sections.

With the prior art load detecting method described above, however, it is difficult to figure out a variety of below-listed unusual loads that may occur at the time of the tool being in an abnormal condition.

First of all, there may be such instances that the load current detected is smaller in the real cutting section than in the load-free feeding section, depending on the workpiece cutting direction. For example, the load current may be greater at the time of non-cutting operation than the real cutting operation while a tool post is displaced in a horizontal lathe. This is because the tool post is of heavyweight nature and requires greater current to move than at the real cutting time due to the influence of the gravity. Moreover, the load applied to the servomotor is not proportional to the cutting load unlike the load applied to the spindle motor mainly because the load of the servomotor may vary with the posture of a tool during the cutting operation and the shape of the workpiece to be cut. This means that it is no longer possible to determine a stereotyped load pattern in case of multi-axis cutting process.

Secondly, the cutting tools employed in a machine tool is usually provided with plural numbers of cutting edges and, therefore, irregular oscillatory load current may be generated in case that one or two cutting edge of the tool is severely worn or broken. The oscillatory load current at this time becomes either greater or smaller than the reference load current during normal cutting operation. No tool abnormality can be detected in the event that the oscillatory load current is smaller than the reference load current.

Thirdly, non-load condition may take place even in the real cutting process if the tool is broken completely and fails to make contact with the workpiece, although overload condition would be kept at the time of severe wear or partial damage of the tool. At this instance, it becomes impossible to detect the tool breakage by the conventional method wherein determination is made as to whether the current supplied to the spindle motor or the servomotor exceeds a maximum reference value. For the very reason, the cutting depth of the tool in the next cutting process is increased beyond a permissible limit, which leads to attendant breakage of the tool newly changed in the subsequent cutting process.

SUMMARY OF THE INVENTION

Accordingly, the present invention is conceived to solve the above and other problems inherent in the prior arts, and it is an object of the invention to provide a tool abnormality detecting method and apparatus that can accurately detect the tool abnormality occurred by the breakage of a cutting tool as well as the abnormality of the tool induced by the excessive wear or partial damage.

Another object of the invention is to provide a tool abnormality detecting method and apparatus that enables the tool abnormality detection to be made at a real cutting section rather than a non-cutting section, thus assuring accurate detection of the tool abnormality.

According to one aspect of the invention, there is provided a method of detecting tool abnormality in a machine tool comprising the steps of: determining permissible minimum and maximum values of load current for one or both of a spindle motor and a servomotor during normal operation of the machine tool; measuring load current with respect to one or both of the spindle motor and the servomotor while the machine tool is operated; extracting the load current measured only in a real cutting section other than a non-cutting section by way of filtering the load current measured; judging whether the extracted load current lies in a range between the permissible minimum and the maximum values; and confirming occurrence of the tool abnormality if the extracted load current falls outside the range.

According to another aspect of the invention, there is provided an apparatus of detecting tool abnormality in a machine tool comprising: a numerical controller including an input part for entering permissible minimum and maximum values of load current of a spindle motor and a servomotor together with information on a real cutting section and a non-cutting section, a memory part for storing the load values and the information entered by the input part, means for measuring load current of one or both of the spindle motor and the servomotor during normal operation of the machine tool, and a processing part for judging tool abnormality and issuing a tool skip or machine stop command to the machine tool in the event that the load current of one or both of the spindle motor and the servomotor measured in the real cutting section falls outside a range between the permissible minimum and maximum values; and a programmable machine controller responsive to the tool skip or machine stop command issued from the numerical controller for carrying out the tool skip or machine stop operation.

BRIEF DESCRIPTION OF THE DRAWINGS

The above and other objects and features of the present invention will become apparent from the following description of a preferred embodiment given in conjunction with the accompanying drawings, in which.

DETAILED DESCRIPTION OF PREFERRED EMBODIMENT

A preferred embodiment of the present invention will now be described in detail with reference to the accompanying drawings.

Figure 1:
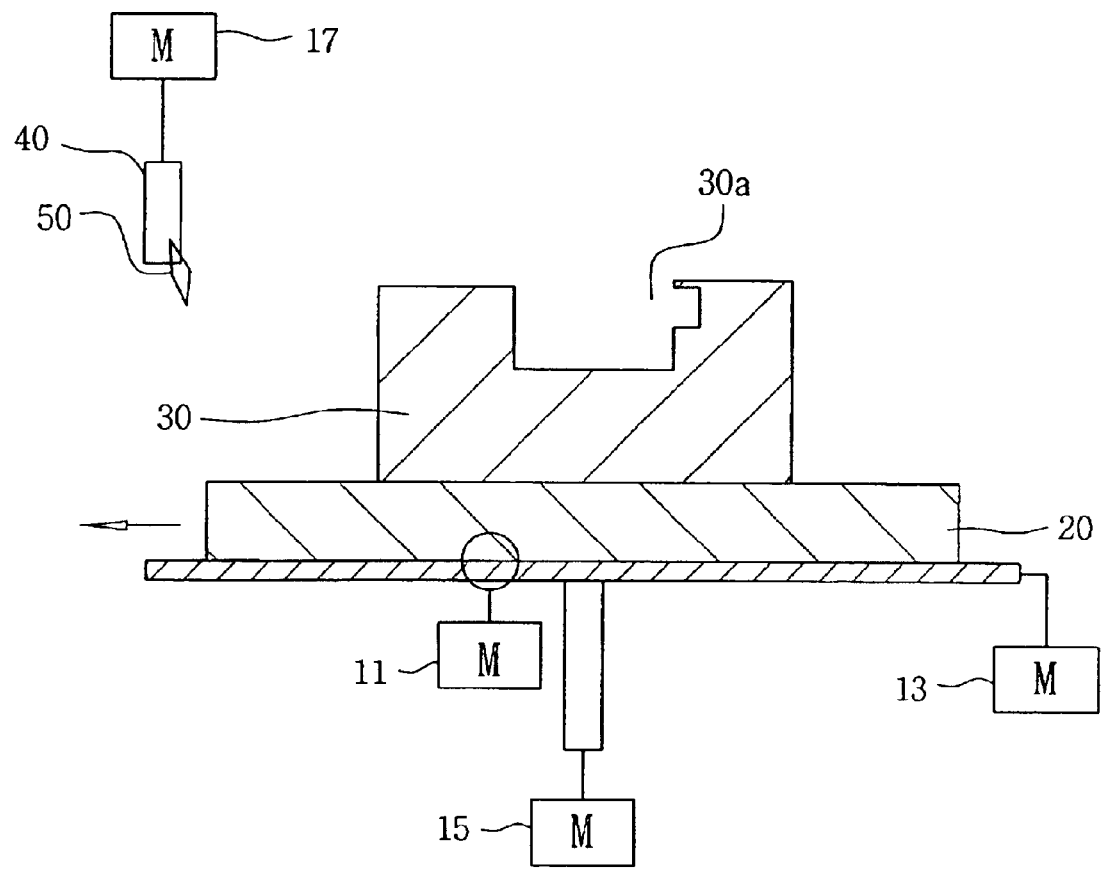
FIG. 1 is a schematic diagram showing a machine tool that employs a tool abnormality detecting apparatus in accordance with the present invention.

Referring first to FIG. 1, there is schematically shown a machine tool that employs a tool abnormality detecting apparatus in accordance with the present invention.

A workpiece 30 to be cut is placed and clamped on a table 20 of a machine tool and, a spindle 40 holding a cutting tool 50 is positioned above the workpiece 30. The table 20 may be displaced in x-, y- and z-axis directions by means of an x-axis servomotor 11, a y-axis servomotor 13 and a z-axis servomotor 15 so that the workpiece 30 can be moved in a desired direction. In concert with the movement of the workpiece 30, the spindle 40 is rotatingly driven by a spindle motor 17 to have the tool 50 cut the workpiece 30 into a desired shape.

The schematic diagram in FIG. 1 is shown under the assumption that the table 20 and hence the workpiece 30 with a pocket 30a are moved from the right to the left. The route of movement of the workpiece 30 may be subdivided into a number of sections as illustrated in FIG. 2, wherein an "approach section" denotes the section through which the workpiece 30 moves from the initial position up to the tool, a "receding section" meaning the section that ranges from the end point of cutting operation to the stop position of the table 20, a "pocket section" meaning the section in which no cutting operation occurs due to the presence of the pocket 30a of the workpiece 30, an "accelerating section" and a "decelerating section" meaning the section that the workpiece 30 moves faster or slower toward or away from the tool 50, and a "real cutting section" meaning the section in which the workpiece 30 is cut actually by the tool 50.

Referring again to FIG. 2, there is shown a waveform of load current of the x-axis servomotor 11 when the workpiece 30 is subjected to cutting operation as in FIG. 1. Although the tool abnormality detecting method should be equally applied to the spindle motor 17 as well as the servomotors 11, 13, 15, description will be made hereinbelow by relying upon the x-axis servomotor 11 for the sake of simplicity.

As set forth above, the route of movement of the workpiece 30 is subdivided into the accelerating section, the decelerating section, the approach section, the receding section, the pocket section and the real cutting section. The accelerating section is located ahead of the approach section and the decelerating section lies in the rear of the receding section. The workpiece 30 moves toward the tool 50 at a gradually increasing speed in the accelerating section, whereas the workpiece 30 moves away from the tool 50 at a gradually reducing speed in the receding section.

Figure 2:
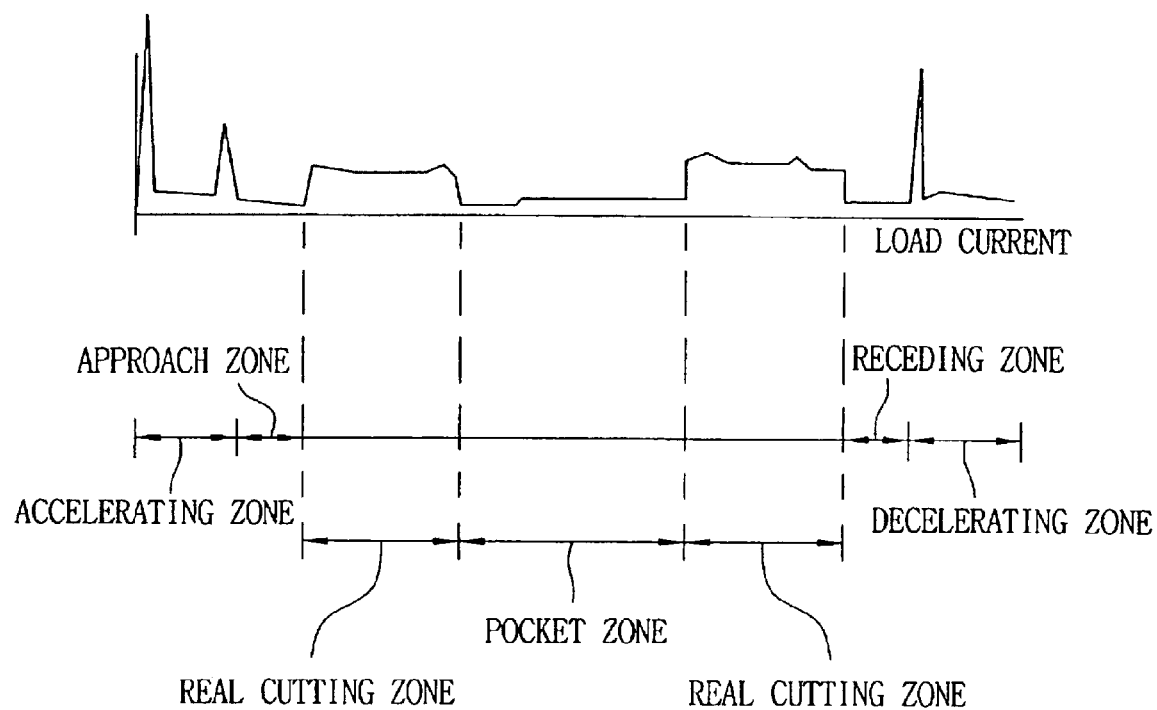
FIG. 2 shows a waveform of load current measured for a servomotor.

Load is applied to the x-axis servomotor 11 mainly in the real cutting section and the load current measured in the real cutting section is substantially constant as shown in FIG. 2 while the normal cutting operation proceeds. The load current in the approach section, the pocket section and the receding section is smaller than the load current measured in the real cutting section. In contrast, the load current in the accelerating section and the decelerating section is temporarily soared up to a value greater than the load current in other sections.

Figure 3:
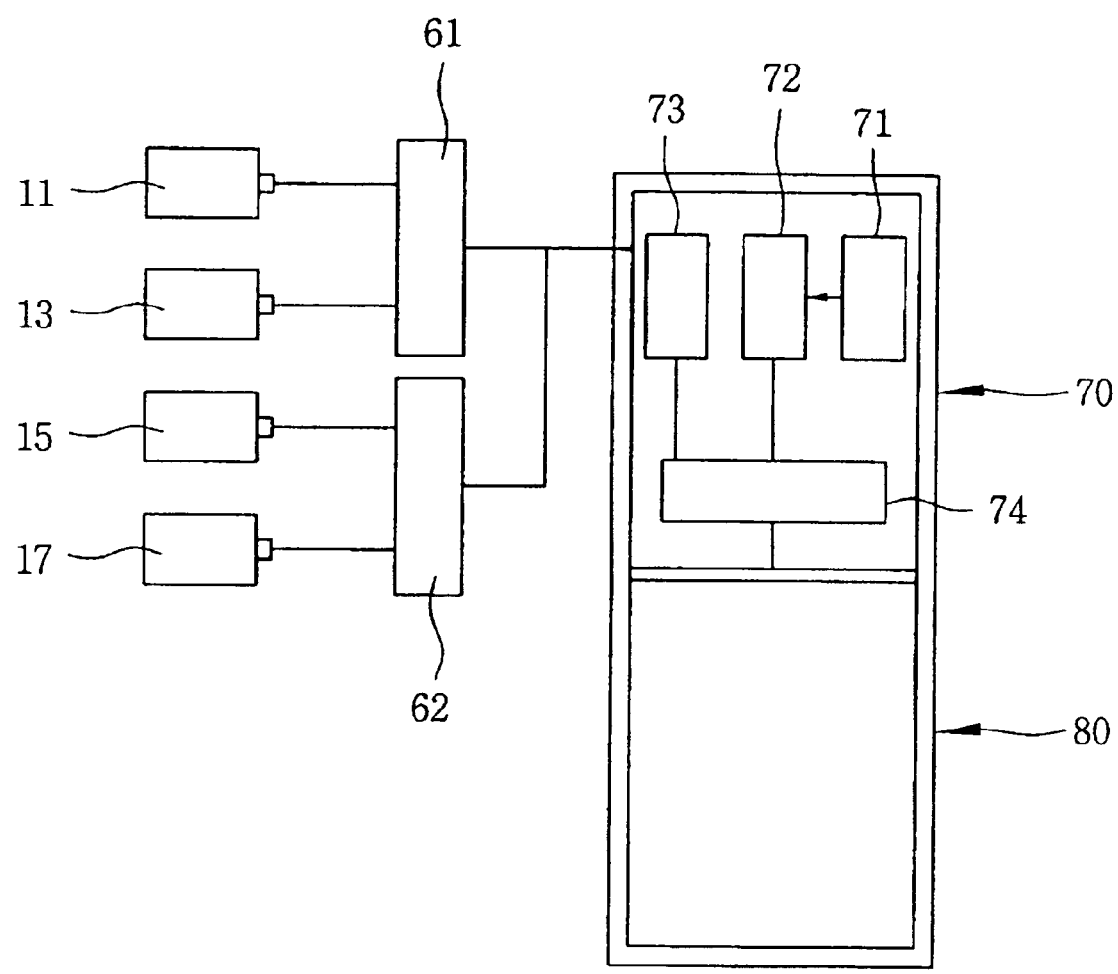
FIG. 3 is a block diagram showing a machine tool control system that incorporates a tool abnormality detecting apparatus in accordance with the present invention.

Turning to FIG. 3, there is shown a machine tool control system that incorporates a tool abnormality detecting apparatus in accordance with the present invention. The machine tool control system, usually called "CNC", comprises a numerical controller (NC) 70 adapted to control such devices as servomotor drives 61, 62 which in turn serve to drive the servomotors 11, 13, 15 and the spindle motor 17. The numerical controller 70 stores the program for carrying out the tool abnormality detecting method in accordance with the invention. The machine tool control system further comprises a display device (not shown) and a programmable machine controller (PMC) 80 for receiving command signals from the numerical controller 70 and performing machine control operations required.

The numerical controller 70 includes an input part 71 for entering permissible minimum and maximum values of load current of the spindle motor 17 and the servomotors 11, 13, 15 together with information on a real cutting section and a non-cutting section, a memory part 72 for storing the load values and the information entered by the input part 71, a current detector 73 for measuring load current of one or both of the spindle motor 17 and the servomotors 11, 13, 15 during normal operation of the machine tool, and a processing part 74 for judging the tool abnormality and issuing a tool skip or machine stop command in the event that the load current of one or both of the spindle motor 17 and the servomotors 11, 13, 15 measured in the real cutting section falls outside the range between the permissible minimum and maximum values. The programmable machine controller 80 is adapted to perform the tool skip or machine stop operation in response to the tool skip or machine stop command issued from the numerical controller 70.

The numerical controller 70 is inputted a variety of information required to control the operation of the machine tool. The information includes, but is not limited to, a so-called M-code comprising the information on the approach section, the pocket section and the receding section of the workpiece 30, and the information on the feed rate, speed and position in relation to the operation of the servomotors 11, 13, 15. The numerical controller 70 is also inputted the information on the normal load current of the spindle motor 17 and the servomotors 11, 13, 15 at the time of normal operation of the machine tool.

The numerical controller 70 is adapted to find the load current in the real cutting section by way of filtering current signals on the basis of the information inputted beforehand, and compare the load current measured in the real cutting section with the normal load current in order to judge the occurrence of tool abnormality. At this time, the tool abnormality is confirmed if the load current measured in the real cutting section falls outside the permissible minimum and maximum values. The programmable machine controller 80 accomplishes a tool skip or machine stop command upon confirmation of the tool abnormality.

One of the important features of the present invention is that the tool is judged to be in normal condition as far as the load current measured in the real cutting section remains within the range between the permissible minimum and maximum values and vice versa.

The tool abnormality detecting method according to the invention will be described in more detail with reference to FIGS. 4 and 5.

Figure 4:
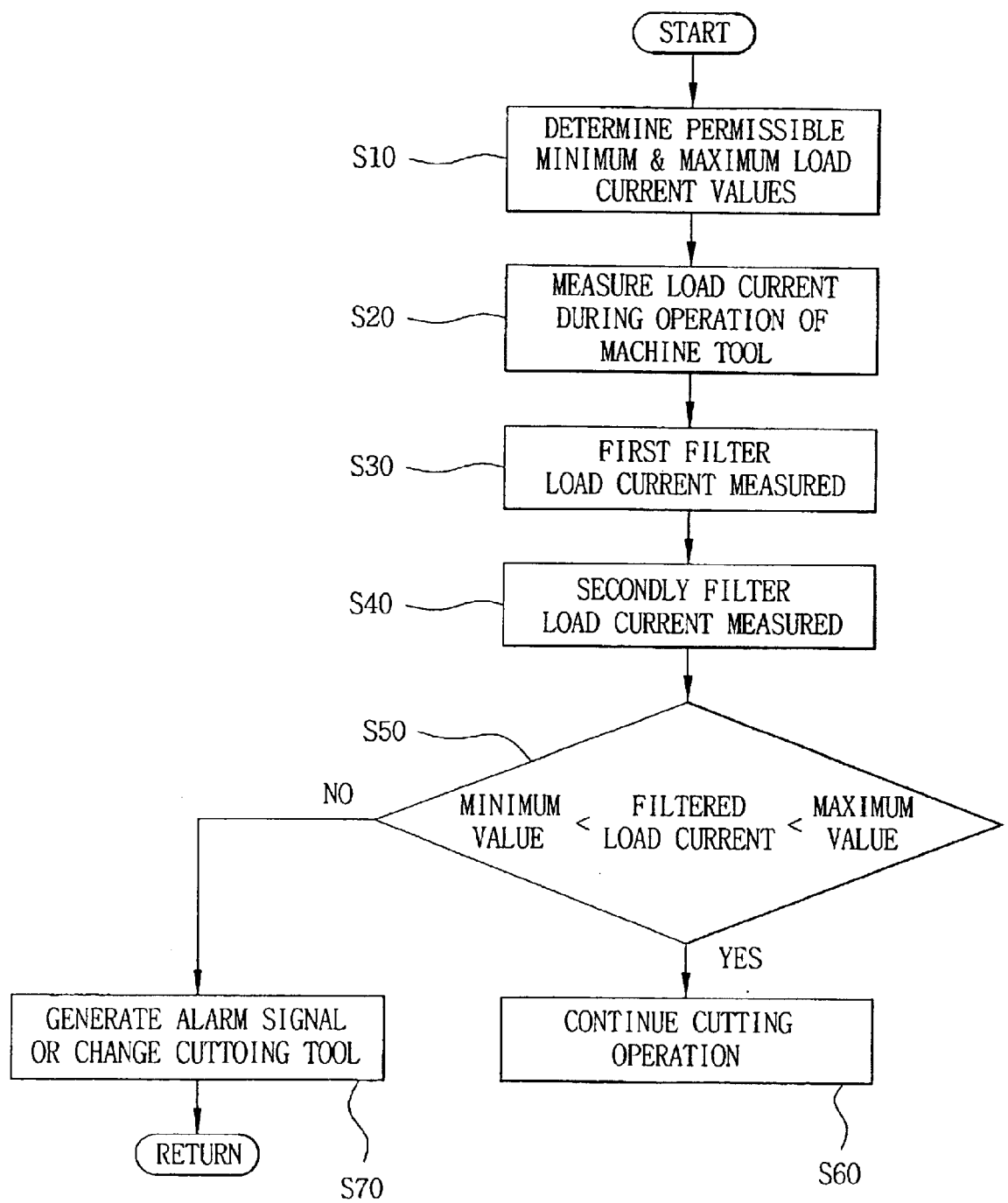
FIG. 4 is a flowchart illustrating a tool abnormality detecting method in accordance with the present invention.
Figure 5:
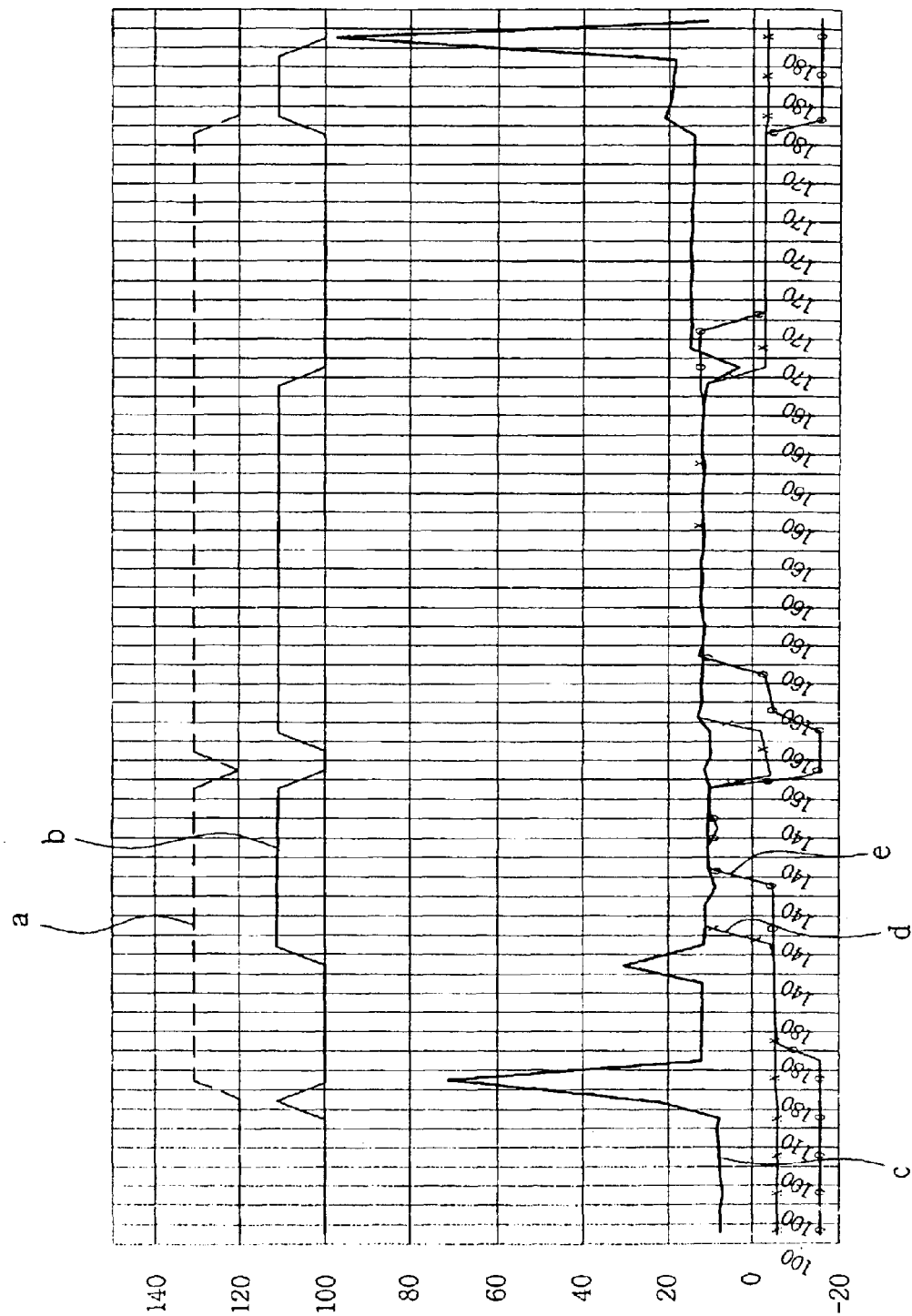
FIG. 5 shows waveforms of load current filtered by the tool abnormality detecting method in accordance with the present invention

At step S10 shown in FIG. 4, permissible minimum and maximum values of load current for the x-axis servomotor 11 is determined before the machine tool starts the cutting operation of the workpiece 30. The determination of the minimum and maximum values is made on the basis of load current data empirically obtained during normal operation of the machine tool. The permissible minimum and maximum values of load current may vary depending on the kind of workpiece, the type of tool and the pattern of cutting operation. The numerical controller 70 is preliminarily inputted the permissible minimum and maximum values of load current so determined, along with various information such as the M-code that are required to detect the tool abnormality.

In order to detect the tool abnormality during operation of the machine tool, the load current of the x-axis servomotor 11 is measured at step S20 while the machine tool is operated. The measurement of the load current is made over the entire moving distance of the workpiece 30 from the starting point to the ending point, including the accelerating section, the approach section, the real cutting section, the pocket section, the receding section and the decelerating section. Therefore, at steps S30 and S40, filtering operations are performed to extract the load current data measured only in the real cutting section other than the non-cutting sections from the total load current data obtained. Such filtering operations may be carried out during or after the measurement of the load current.

Meant by the term "filtering" herein is that the load current values measured in the non-cutting sections, i.e., the accelerating section, the approach section, the pocket section, the receding section and the decelerating section are excluded from the from the entire values of load current measured. The filtering operations are divided into a first filtering step (S30) and a second filtering step (S40).

At the first filtering step (S30), the load current values measured in the accelerating section, the decelerating section and the approach section are filtered and excluded. Referring to FIG. 5, reference character "a" designates a feed signal that is supplied to the x-axis servomotor drive 61 by the numerical controller 70. The x-axis servomotor 11 is so operated as to move the workpiece 30 in the x-axis direction while the feed signal "a" continues to be supplied. Reference character "c" designates a percentage of the real time load current value measured in the x-axis servomotor 11 with respect to the rated current of the servomotor 11.

Reference character "b" designates a signal informing of the workpiece moving sections for which the first and second filtering steps have to be carried out to find the real cutting section. This signal "b" is generated by the numerical controller 70 on the basis of the information stored in the numerical controller 70, including the actuation of the servomotors 11, 13, 15, the target speed arrival of the spindle motor 17, the constant speed control of the spindle motor 17 and the M-code information.

Reference character "d" designates a first filtered load current value that is obtained by way of bypassing the load current value "c" to the extent as much as the accelerating and decelerating time depending on the variation of the signal "b" and then bypassing the load current value "c" to the extent as much as the approach section time entered by the operator as the feed signal "a" is changed from an off-condition to an on-condition. In other words, the first filtered load current value "d" can be obtained by identifying the accelerating section, the decelerating section and the approach section based on the signal "b" under the on-condition of the feed signal "a" and then removing the signal "c" that falls in these sections.

Subsequently, at step S40, the second filtering is performed to remove the load current value corresponding to the receding section from the first filtered load current value. The second filtering is carried out by way of excluding the load current value in the receding section after time lag is applied to the first filtered load current value "d" to the extent as much as the receding section time. Namely, the load current value in the receding section is filtered out from the signal "c" in such a manner that the load current value corresponding to the value stored for signal delay at the time of the feed signal "a" being in the off-condition is removed from the signal "c". Although the approach section can be measured from the starting point of feeding operation, it is impossible to identify the starting point of the receding section from the load current value inputted on a real time basis, because the receding section lies in a certain time period before the end of feeding operation.

Through the filtering process noted above, it can be appreciated that the real cutting section is equivalent to the section during which the feed signal "a" is turned on under the condition that the time lag corresponding to the receding section time is applied to the first filtered load current value. Reference character "e" in FIG. 5 designates the secondly filtered signal.

In the meantime, in order to assure accurate detection of the tool abnormality, it is necessary to exclude the pocket section defined in the M-code from the real cutting section obtained through the second filtering process. The filtering of the load current value corresponding to the pocket section for this purpose may be performed at the time of the first filtering.

The signal "e" contains only the load current value measured in the real cutting section because the first and second filtering processes has excluded the load current value in the non-cutting section.

At step S50, judgment is made as to whether the filtered load current value falls in the range between the permissible minimum and maximum values predetermined. The rising edges in the waveform of the signal "e" are excluded from the subject for whom the above judgment is made. If the filtered load current value of the signal "e" is greater than the permissible maximum value, it is judged that an overload condition has occurred due to the excessive wear of the cutting tool. Conversely, if the filtered load current value is smaller than the permissible minimum value, it is judged that no cutting operation is performed due to the breakage of the cutting tool.

In the event that the filtered load current value lies between the permissible minimum and maximum values, the cutting operation continues to proceed at step S60. If, however, the filtered load current value falls outside the range between the permissible minimum and maximum values, an alarm signal is generated at step S70 to inform the operator of the excessive wear or breakage of the cutting tool. Alternatively or additionally, the machine tool may automatically change the excessively worn or broken cutting tool with a new one.

In this fashion, the tool abnormality detecting operation is completed for one cutting process and the same operation of detecting the tool abnormality will be reiterated for the next cutting process.

According to the preceding embodiment, the inventive method and apparatus was set forth based on the x-axis servomotor 11 by way of example. It should be noted, however, that other servomotors 13, 15 than the x-axis servomotor 11 or the spindle motor 17 may be equally used to detect the tool abnormality. In this case, the permissible minimum and maximum values of load current under normal operation of the machine tool have to be preliminarily determined and inputted with respect to the servomotors 13, 15 or the spindle motor 17. Additionally, the load current value of the servomotors 13, 15 or the spindle motor 17 must be measured while the machine tool is actually operated. It may be contemplated that the permissible minimum and maximum values are automatically measured and recorded as one demonstrative cutting operation is carried out with the approach section and the receding section inputted into the numerical controller.

In case of the spindle motor 17 being used, the tool abnormality detecting process would be performed substantially in the same manner as the x-axis servomotor 11. This is because the load current value of the spindle motor 17 will be increased beyond the permissible maximum value if the tool fails to cut the workpiece 30 smoothly as a result of the excessive tool wear, while the load current value of the spindle motor 17 will be reduced to below the permissible minimum value if load-free cutting operation proceeds due to the tool breakage.

The load current pattern may differ from the spindle motor 17 when the servomotors 13, 15 are used to detect the tool abnormality. In other words, in case that the table 20 is moved in a direction perpendicular to the cutting feed direction, the load current may often decrease exceedingly if mechanical overload occurs due to the excessive wear of the tool 50. Although the load current of the servomotors tends to soar at the occurrence of a mechanical overload, the load applied to servo-axes is not proportional to the cutting load exerted on a spindle and varies depending on the type of cutting process, the orientation of the cutting tool and the shape of the workpiece.

To the contrary, the load current may sometimes be increased to a great extent even in the non-load condition induced by the tool breakage. The reason for this is that the table 20 is position-controlled under the influence of inertial load. Furthermore, in the event that the table 20 is moved in a direction neither perpendicular nor parallel to the cutting feed direction, the inertial load and the mechanical load are coupled together; thus changing the range of minimum and maximum values of load current.

In any case, the tool abnormality can be detected by way of preliminarily determining the permissible minimum and maximum values of load current of the servomotor under a normal operating condition and then judging whether the load current value measured during real cutting operation lies between the permissible minimum and maximum values.

According to the invention described above, it is judged that the tool abnormality has occurred not only in case that the real load current exceeds the permissible maximum value predetermined but also in case that the real load current is smaller than the permissible minimum value. This makes it possible to precisely detect the tool breakage, in addition to the excessive wear of the cutting tool, thus avoiding attendant tool breakage, which would otherwise necessarily occur in the next cutting process.

Moreover, the present invention assures accurate and precise detection of the tool abnormality, thank to the fact that the detection is performed only for the real cutting section, excluding other non-load feed sections of the machine tool.

While this invention has been described in connection with what is presently considered to be the most practical and preferred embodiment, it is to be understood that the invention is not limited to the disclosed embodiment, but on the contrary, it is intended to cover various modification within the spirit and the scope of the appended claims.

What is claimed is:

1. A method of detecting tool abnormality in a machine tool having a spindle motor and a servomotor, said method comprising the steps of:

determining permissible minimum and maximum values of load current for one or both of the spindle motor and the servomotor during normal operation of the machine tool;

measuring a load current of one or both of the spindle motor and the servomotor while the machine tool is operated;

extracting the load current measured only in a real cutting section other than a non-cutting section by way of filtering the measured load current;

judging whether the extracted load current lies in a range between the permissible minimum and the maximum values; and confirming occurrence of a tool abnormality if the extracted load current falls outside the range;

wherein said extracting step comprises excluding the load current measured in an approach section, a pocket section, a receding section, en accelerating section and a decelerating section.

2. The method of claim 1, wherein said excluding step comprises a first filtering step of excluding the load current measured in the accelerating section the decelerating section and the approach section, and a second filtering step of excluding, from the first filtered load current, the load current measured in the receding section with a time lag corresponding to the receding section, and then excluding the load current measured in the pocket section, if the pocket section exists.

3. A method of detecting tool abnormality in a machine tool having a spindle motor and a servomotor, said method comprising the steps of:

determining permissible minimum and maximum values of load current for one or both of the spindle motor and the servomotor during normal operation of the machine tool;

measuring a load current of one or both of the spindle motor and the servomotor while the machine tool is operated;

extracting the load current measured only in a real cutting section other than a non-cutting section by way of filtering the measured load current;

judging whether the extracted load current lies in a range between the permissible minimum and the maximum values; and confirming occurrence of a tool abnormality if the extracted load current falls outside the range;

wherein said permissible minimum and maximum values of load current are preliminarily determined by using the minimum and maximum values of a load current obtained, through measurement, during real cutting operations with normal load, and the minimum and maximum values of a load current obtained during demonstration cutting operations.

4. An apparatus for detecting tool abnormality in a machine tool having a spindle motor and a servomotor, said apparatus comprising:

a numerical controller including
an input part for entering permissible minimum and maximum values of load current of the spindle motor and the servomotor together with information on a real cutting section and a non-cutting section,
a memory part for storing the values and the information entered at the input part,
a measuring part for measuring a load current of one or both of the spindle motor and the servomotor during normal operation of the machine tool, and
a processing part for judging tool abnormality and issuing a tool skin or machine stop command in the event that the load current of one or both of the spindle motor and the servomotor measured in the real cutting section falls outside a range between the permissible minimum and maximum values; and a programmable machine controller responsive to the tool skip or machine stop command issued from the numerical controller for carrying out a tool skip or machine stop operation;

wherein said numerical controller is adapted to extract the load current measured only in the real cutting section other than the non-cutting section by way of filtering the load current measured, and to judge tool abnormality on the basis of the extracted load current; and said numerical controller is adapted to exclude the load current measured in the non-cutting section on the basis of the information regarding at least one of an approach section, a pocket section, a receding section, an accelerating section and a decelerating section.

5. The apparatus of claim 4, wherein said numerical controller is adapted to exclude the load current measured in the non-cutting section through a first filtering step of excluding the load current measured in the accelerating section, the decelerating section and the approach section, and a second filtering step of excluding, from the first filtered load current, the load current measured in the receding section with a time lag corresponding to the receding section, and then excluding the load current measured in the pocket section, if the pocket section exists.

* * * * *